United States Patent [19]

Tepas et al.

[11] Patent Number: 5,671,803

[45] Date of Patent: Sep. 30, 1997

[54] MODULAR CONDENSER AND FAN SHROUD ASSEMBLY

[75] Inventors: John Milton Tepas, East Amherst; Robert Michael Mowell, Wilson, both of N.Y.

[73] Assignee: General Motors Corporation, Detroit, Mich.

[21] Appl. No.: 547,006

[22] Filed: Oct. 23, 1995

[51] Int. Cl.⁶ .............................. B60K 11/04; F28F 3/00; F28F 9/00

[52] U.S. Cl. .................. 165/41; 165/67; 165/140; 165/122; 165/78; 180/68.4

[58] Field of Search .................. 165/67, 140, 41, 165/122, 78; 180/68.4, 68.1

[56] References Cited

U.S. PATENT DOCUMENTS

| | | | |
|---|---|---|---|
| 4,651,816 | 3/1987 | Struss et al. | 165/76 |
| 4,979,584 | 12/1990 | Charles | 180/68.1 |
| 4,997,033 | 3/1991 | Ghiani et al. | 165/140 |
| 5,046,554 | 9/1991 | Iwasaki et al. | 165/140 |
| 5,219,016 | 6/1993 | Bolton et al. | 165/41 |
| 5,269,367 | 12/1993 | Susa et al. | 165/67 |
| 5,476,138 | 12/1995 | Iwasaki et al. | 180/68.4 |

FOREIGN PATENT DOCUMENTS

| | | | |
|---|---|---|---|
| 0178266 | 9/1985 | European Pat. Off. | |
| 0219021 | 10/1986 | Germany | |
| 3916777 | 4/1990 | Germany | 180/68.4 |
| 4039490 | 6/1992 | Germany | 180/68.4 |
| 5-215484 | 8/1983 | Japan | 165/140 |
| 0012292 | 1/1984 | Japan | 165/67 |
| 5-215483 | 8/1993 | Japan | 165/140 |

*Primary Examiner*—John K. Ford
*Attorney, Agent, or Firm*—Patrick M. Griffin

[57] ABSTRACT

A fan shroud has side walls that wrap around the side edges of a down flow type radiator, providing both the mounting means for a condenser and side seals to direct air flow from the condenser through the radiator. The lack of direct connection between the radiator and condenser compensates for the lack of overlap between the condenser and radiator tanks, which is the usual means of interconnection. The minimization of contact between the shroud and radiator, which is secured only to the back of the radiator tanks with threaded fasteners, allows the same shroud and condenser to be packaged more easily with differing radiator designs.

3 Claims, 3 Drawing Sheets

MODULAR CONDENSER AND FAN SHROUD ASSEMBLY

This invention relates to vehicle cooling systems in general, and specifically to a modular condenser and fan shroud assembly that mounts the condenser indirectly to the vehicle body, with minimal interface with the radiator.

BACKGROUND OF THE INVENTION

Vehicles with water cooled engines almost invariably mount a vehicle radiator to the vehicle body within a front grill opening. The grill opening is an approximately rectangular opening defined by horizontal upper and lower tie bars and vertical side supports. The radiator core is rectangular, fitting within the grill opening, and bounded by a pair of parallel manifold tanks and a pair of parallel core reinforcements. Generally, the radiator manifold tanks are plastic moldings and are much larger than the core reinforcements, which are thin, U shaped aluminum channels. The most common orientation for the radiator puts the manifold tanks on the side, and the core reinforcements at top and bottom. Less commonly, the radiator is oriented in a so called down flow configuration, with the tanks at top and bottom, and with the core reinforcements providing side edges. In either case, the radiator tanks are used to mount the radiator to the vehicle body. In the more common radiator orientation, the top and bottom ends of the radiator are fastened to the upper and lower tie bars captured within elastomer blocks or grommets to provided vibration isolation. With a down flow radiator, the same basic radiator mounting system is used, except that locations along the length of the tanks, not the tank ends, are fixed to the upper and lower tie bars. A cooling fan is mounted to a fan shroud behind the radiator to pull cooling air through the grill opening and radiator. This is commonly a plastic molded structure that is fastened to the back sides of the radiator tanks, wherever they are located. The tanks, again, are a much more convenient structure in which to mold in screw retention bosses and other structural fastening features than are the radiator core reinforcing channels.

While a water cooled radiator is almost universal, an air conditioning condenser is less so, though increasingly common. While fully integrated radiators and condensers have been proposed, current production condenser designs are almost always separate structures that have to be separately mounted to the vehicle, in front of the radiator and within the same basic opening. One common type of condenser has a construction basically like the radiator, four sided with parallel manifold tanks and parallel, channel shaped core reinforcements, although the manifold tanks must be vertically oriented. The manifold tanks, since they see far higher pressures, are brazed aluminum structures, not plastic moldings, but still represent a better structural location for fastening structures than do the thinner core reinforcements. The fastening structures are generally simpler however, such as flat tabs or flanges, rather than more complex molded bosses or hooks. The condenser tanks may be separately mounted to the vehicle body, independently of the radiator. Or, they may be conveniently mounted to the front side of the radiator tanks, at least when the radiator tanks are also vertically oriented, and run generally coextensive to the condenser tanks. Co-assigned U.S. Pat. No. 5,219,016 shows a radiator, condenser and fan shroud assembly in which the fan shroud is set into hooks on the back sides of the radiator tanks and the condenser is set into hooks on the front side of the radiator tanks. European Patent Application 0178266 shows a more conventional assembly in which the shroud and condenser are fixed to the back and front of the radiator tanks with threaded fasteners. Each design, again, relies on the radiator tanks and condenser tanks both being vertically oriented and coextensive. However, the radiator and condenser tanks are not tight against one another, but have an extensive gap between them. Each design also, therefore, also incorporates a separate air baffle, mounted either in front or behind the condenser, to seal the gap between the radiator and condenser tanks and assure that air pulled in through the condenser is also forced through the radiator, without excessive side leakage.

The basic design just described becomes impractical or impossible when the radiator is the down flow type, since the vertical condenser tanks are now not coextensive with the horizontal radiator tanks. Furthermore, the high degree of structural connection between and among radiator, condenser and fan shroud, in which the three together represent a unique package, would make it more difficult for a supplier of just the fan shroud and condenser to interface with an existing radiator design.

SUMMARY OF THE INVENTION

The invention provides a modular condenser and fan shroud assembly that will work in conjunction with a down flow radiator. The condenser is not attached directly to either the radiator or the vehicle body, but to the specially designed fan shroud, which also eliminates the need for a separate baffle structure to provide side air seals between the radiator and condenser. By minimizing the structural interface between radiator and condenser, it is easier to use the shroud and condenser package with different radiators.

In the embodiment disclosed, the vehicle body has a four sided grill opening and a down flow type radiator. The horizontal top and bottom tanks of the radiator are secured within the grill opening, between upper and lower tie bars, and the radiator core reinforcements run parallel to and inboard of the grill opening side supports. A molded plastic fan shroud is attached to the back of the radiator tanks, independently of the fasteners that join the tanks to the grill opening tie bars. The fan shroud has continuous, vertical side walls that wrap around and past the radiator core reinforcements and which terminate in perpendicular side flanges located in front of the radiator. The vertical manifold tanks of the condenser also have side flanges which fit through the grill opening and into abutment with the fan shroud side wall flanges. This allows the condenser to be attached directly to the fan shroud, unaffected by the lack of overlap between the horizontal radiator tanks and the vertical condenser tanks. Furthermore, the continuous side walls of the fan shroud substantially seal the gap between the condenser and radiator, assuring that air passing through the grill opening and the condenser is forced through the radiator as well, with no need for a separate air baffle. Since the only connection between the radiator tanks and the condenser is the indirect connection of the fan shroud to the back of the radiator tanks, which is a simple threaded fastener connection, it is easier to adapt the package of condenser and fan shroud to different, pre existing radiator styles.

DESCRIPTION OF THE PREFERRED

These and other features of the invention will appear from the following written description, and from the drawings, in which.

Figure 1:
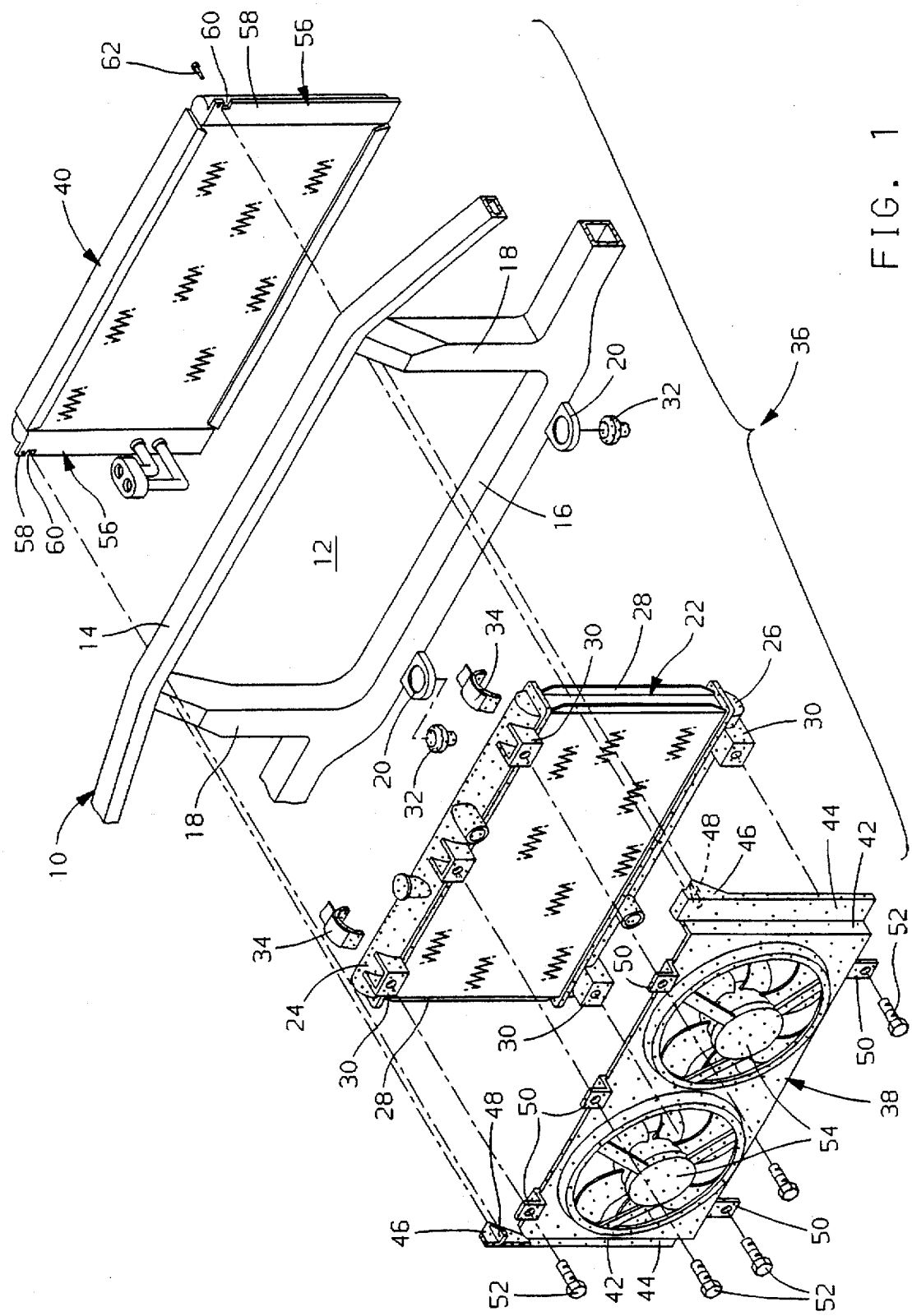
FIG. 1 is an exploded perspective of a vehicle body grill opening, with radiator, fan shroud and condenser disassembled.

Referring fast to FIG. 1, the front of a vehicle body, indicated generally at 10, inlets cooling air through a generally rectangular grill opening 12 comprised of an upper tie bar 14, parallel lower tie bar 16, and a pair of parallel side supports 18. The upper ends of the side supports 18 are sloped forward where they join the upper tie bar 14. Lower tie bar 16 includes a pair of rings 20. A down flow type radiator, indicated generally at 22, includes an upper manifold tank 24, lower manifold tank 26, and a pair of thin, vertical core reinforcements 28, which are open aluminum channels. Threaded bosses 30 are molded to the back of the tanks 24 and 26, though no equivalent structures need be molded to the front. In general, radiator 22 constitutes a rectangle that fits within grill opening 12, with the upper tank 24 located along the upper tie bar 14, the lower tank 26 located along the lower tie bar 16, and with the core reinforcements 28 located parallel to and inboard of the inside of the side supports 18. Radiator 22 is installed with conventional rubber isolators 32, which fit over non illustrated integral pins on the bottom of the lower tank 26 and into the lower tie bar rings 20, and conventional resilient brackets 34, which fit over the top of upper tank 24 and are secured to the top of upper tie bar 14. These fasteners provide a secure and vibration damped attachment for radiator 22, and is basically a conventional system, but for the horizontal location of the tanks 24 and 26. The core reinforcements 28 constitute the side edges of the radiator 22, and provide very little potential to attach any other structure thereto.

Figure 4:
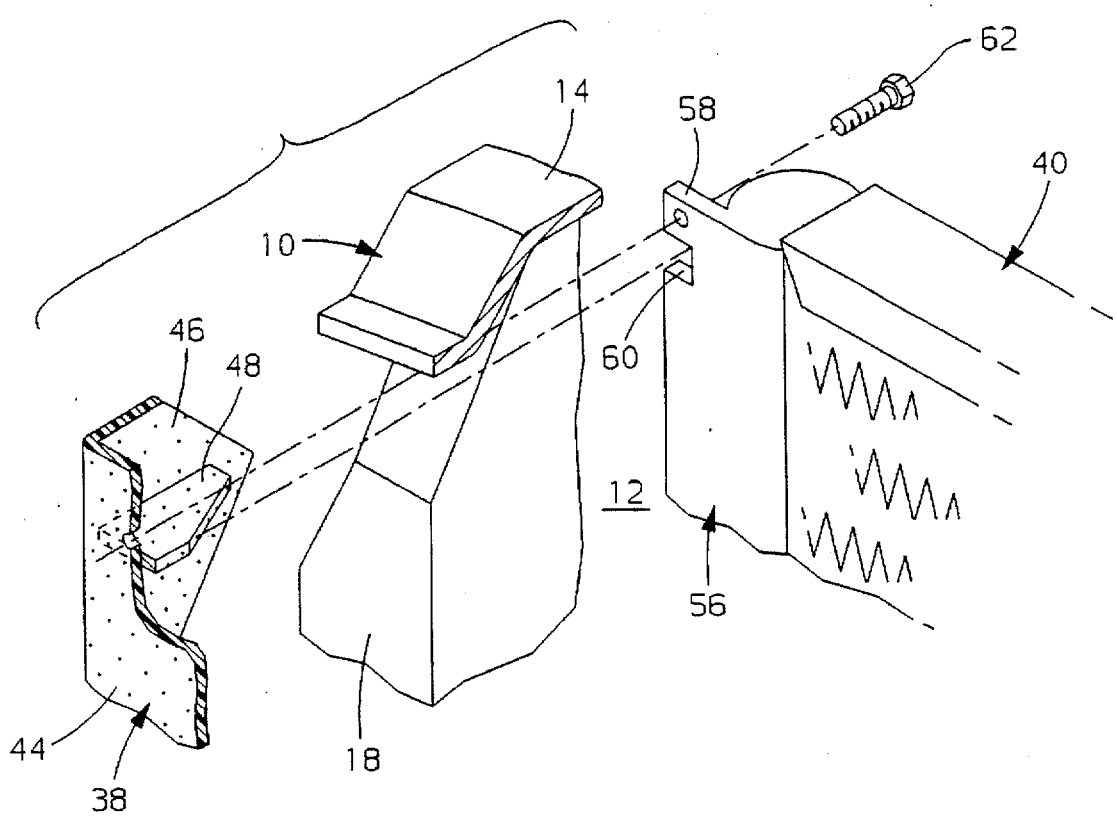
FIG. 4 is a perspective view of just the upper ends of a grill opening side support, the condenser tank flange, and shroud side wall, all disassembled.

Referring next to FIGS. 1 and 4, the invention provides a modular assembly, indicated generally at 36, including a fan shroud, indicated generally at 38, and a condenser, indicated generally at 40. The modular assembly 36 adapts well to the pre existing environment of vehicle body 10 and attached radiator 22, because it minimizes the structural interface between the condenser 40 and radiator 22, allowing the condenser 40 to be installed with no direct connection to the vehicle body 10 at all, and only an indirect connection to the radiator 22. The particular embodiment disclosed also makes for a very simple installation of the condenser 40 per se, as will appear below. Fan shroud 38 is a generally rectangular plastic molding, comparable in size to radiator 22, though somewhat wider, as measured between vertical side walls 42. The side walls 42 terminate in perpendicular, flat side flanges 44. At the upper end of each side flange 44, as best seen in FIG. 4, a generally triangular fin 46, parallel to the side wall 42, matches the sloped shape of the upper ends of the side supports 18. In addition, a discrete horizontal shelf 48 of generally trapezoidal shape is molded perpendicular to both the side flange 44 and the fin 46, each of which serves a purpose described below. Several apertured tabs 50 mate with the radiator tank bosses 30, and can be secured thereto by conventional threaded fasteners 52. There is no direct connection between the vehicle body 10 and shroud 38, and only a very simple connection between shroud 38 and radiator 22. Shroud 38 carries two conventional cooling fans 54.

Figure 2:
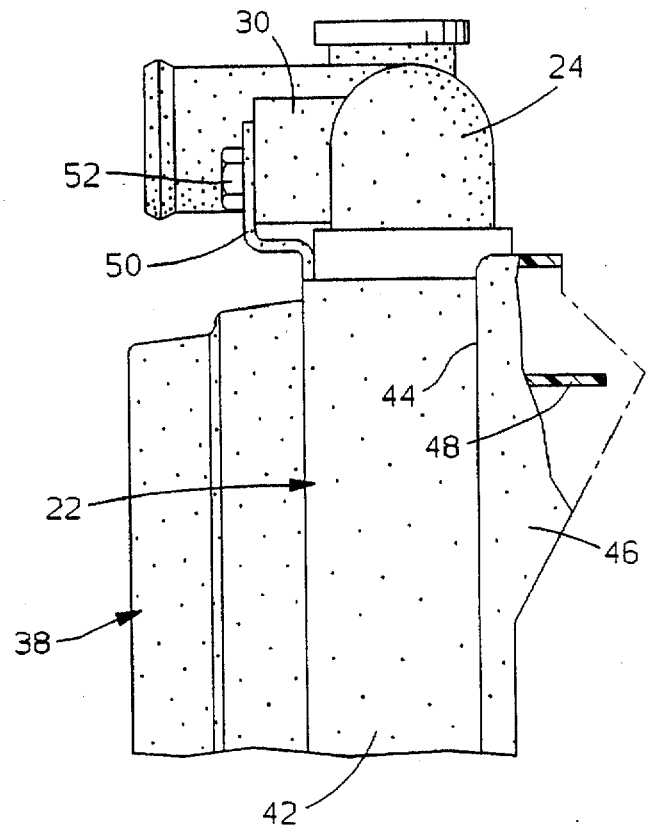
FIG. 2 is a side view of the top of the fan shroud attached to the top radiator tank, before the condenser is installed.
Figure 3:
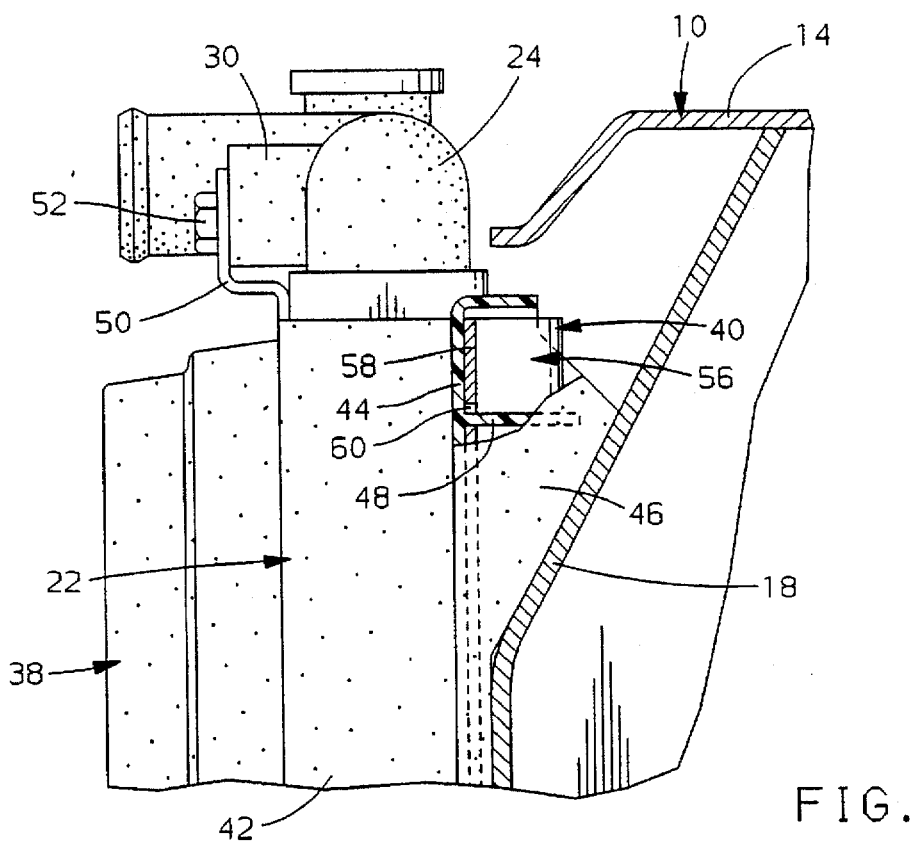
FIG. 3 is a view showing one of the grill opening side supports and upper tie bar in section and showing the fan shroud and condenser installed, with part of the upper end of the fan shroud side wall broken away to reveal the upper end of the condenser tank flange.

Referring next to FIGS. 2 and 3, when shroud 38 is attached to the back of the radiator tanks 24 and 26, the side walls 42 wrap around and past the radiator side core reinforcements 28 and the shroud side flanges 44 are oriented in a plane in from of the radiator 22, within the grill opening 12. The fins 46 match the sloped upper ends of the side supports 18 closely, though not tightly, running along the inboard edges thereof. The side walls 42 clear the radiator core reinforcements 28 with no interference. Most radiator designs will have structural elements like the bosses 30, or provisions for clips or the like, on the back of the tanks in order to attach some kind of fan support. There could be structural features on the front of the radiator tanks to provide direct attachment of some other condenser design. Any such condenser attachment feature would be, at worst, redundant. It would be relatively simple to accommodate the shroud 38 to multiple radiator designs by providing extra tabs like 50, or even drilling holes or slots through the body of the structure. If, as seen in FIG. 2, no condenser 40 were installed, (in a vehicle without air conditioning) then the shroud 38 would just act as a support for the cooling fans 54, as well as providing an integral baffle or guide to direct cooling air between the side supports 18 and through the radiator 22. The shroud 38 is most useful when condenser 40 is installed, however, which has particular features that cooperate with the fan shroud 38, as described next.

Figure 5:
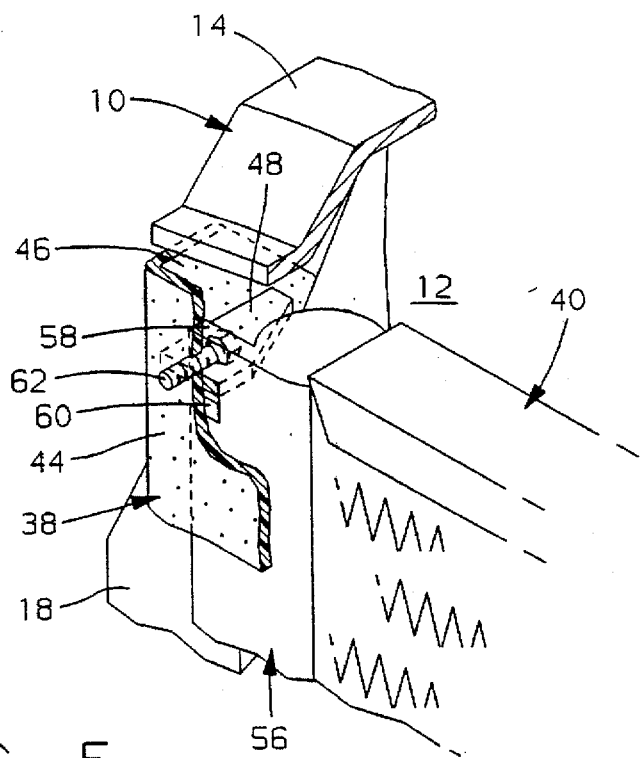
FIG. 5 shows the elements of FIG. 5 assembled together.

Referring next to FIGS. 3 through 5, condenser 40 has vertical side tanks 56, each of which includes an aluminum extrusion formed with a flat side flange 58 that is abuttable with the fan shroud flanges 44. Near the top of each condenser tank side flange 58 is a notch 60 that is alignable with a respective shroud side wall shelf 48. The condenser 40 can be simply installed by pushing it between the vehicle body side supports 18. The notches 60 slide over the shelves 48, which center the condenser 40 between them and allow it to hang temporarily in place with the respective side flanges 58 and 44 in abutment, without being otherwise held. Then, threaded fasteners 62 can be easily secured through the abutted side flanges 58, 44 in as many locations as desired to secure condenser 40 to shroud 38. Condenser 40 is thereby mounted in front of, though not touching, radiator 22. The fact that the condenser tanks 56 and radiator tanks 24 and 26 do not have significant areas of overlap is irrelevant, because the condenser 40 is not directly secured to the radiator 22, but instead to the side walls 42 that wrap past the radiator 22. In addition, the baffling and air guide feature provided by the shroud side walls 42 covers the gap between condenser 40 and radiator 22, as best seen in FIG. 2, and prevents the loss of forced air through the gap. The good conformation of the fins 46 to the vehicle body side supports 18 maintains that seal, as well as providing further support for the shelves 48.

Variations in the disclosed embodiment could be made. If desired, the condenser 40, radiator 22 and shroud 38 could be first installed together as a package of three, before the radiator was installed in the grill opening 12. However, the main advantage of the unique cooperative features of the shroud 38 and condenser 40 is the elimination of direct connection to the vehicle body 10, and the minimization of direct connection to the radiator tanks 24 and 26, which adapts the two well to different styles and sizes of down flow design radiators. Other structural connections between the condenser side flanges 58 and the shroud side flanges 44 could be used, but the notches 60 and shelves 48 provide a great installation advantage by decoupling the hanging and securement processes. Therefore, it will be understood that is not intended to limit the invention to just the embodiment disclosed.

We claim:

1. In a vehicle having a forward vehicle body structure defining a generally rectangular cooling air inlet opening and a radiator located within said air inlet opening having generally horizontal top and bottom tanks attachment to said vehicle body structure and generally vertical side edges, a modular fan shroud and condenser assembly, comprising a fan shroud attached to said radiator top and bottom tanks independently of said radiator to vehicle body attachment, said fan shroud having generally vertical side walls extending around and past said radiator side edges, and, a condenser having generally vertical side flanges sized to fit through said inlet opening and into engagement with said shroud side walls, whereby, said condenser may be attached to said vehicle body indirectly by joining said condenser side flanges to said shroud side walls, while air passing through said inlet opening and condenser is confined by said shroud side walls and directed through said radiator.

2. A modular fan shroud and condenser assembly according to claim 1 in which said shroud side walls further include side flanges abuttable with said condenser side flanges.

3. A modular fan shroud and condenser assembly according to claim 2 in which said fan shroud side flanges further include generally horizontal shelves that fit into corresponding notches in said condenser side flanges, whereby said condenser may be hung temporarily on said fan shroud prior to attachment.

* * * * *